United States Patent [19]
Post

[11] 3,770,876
[45] Nov. 6, 1973

[54] ELASTIC COVER AND METHOD OF APPLYING SAID COVER
[75] Inventor: Herman B. Post, Wapakoneta, Ohio
[73] Assignee: The Goodyear Tire & Rubber Company, Akron, Ohio
[22] Filed: May 8, 1972
[21] Appl. No.: 251,615

[52] U.S. Cl................ 174/88 R, 29/628, 175/84 R, 174/138 F
[51] Int. Cl............................................. H02g 15/08
[58] Field of Search............. 174/84 R, 84 S, 138 F, 174/68 C, 47, 88 R; 138/118, 106, 107; 285/18, 235, 236; 29/628

[56] References Cited
UNITED STATES PATENTS
2,722,237  11/1955  Rosel ............................. 174/47 X
FOREIGN PATENTS OR APPLICATIONS
1,398,654  3/1965  Germany......................... 174/68 C Primary Examiner—Darrell L. Clay
Attorney—F. W. Brunner et al.

[57] ABSTRACT

An elastic cover for disposition over supporting members or work pieces and a method of applying the cover thereover. The cover is a hollow tube of highly expandable elastomeric material which includes gripping means such as longitudinal ribs provided on its outer surface so that the tube may be expanded by outwardly directed forces acting on the ribs. The tube, before expansion is incapable of positioning over the member but after expansion, the tube is capable of positioning over the member and upon contraction, firmly grips the member to provide a tight fitting cover thereover. The invention is particularly useful for sealing splice or repair areas of electrical cables.

19 Claims, 11 Drawing Figures

PATENTED NOV 6 1973 3,770,876

PATENTED NOV 6 1973 3,770,876

ELASTIC COVER AND METHOD OF APPLYING SAID COVER

BACKGROUND OF THE INVENTION

This invention relates to an elastic cover or sleeve member which may be dispositioned on a supporting member or work piece to provide a tightly fitting cover therefor and to the method of applying the cover over the member. More specifically, this invention relates to a splice cover for an electrical cable and a method of applying the cover to provide a tightly fitting seal for the splice or repair area of the cable.

In the prior art, various general approaches have been employed for providing a cover for a work piece such as a spliced or repaired section of electrical cable. One approach has been to provide a plastic heat shrinkable cover over a spliced area and fuse the ends of the cover in sealing contact with the outer surface of the cable by means of an electrical current passed through coils which have been wrapped around the spliced area and connected to a storage battery or the like. This method is described in Foreit U.S. Pat. No. 2,695,853. In another similar method of applying a cover to a cable splice, an oversized heat shrinkable plastic sleeve having an adhesive applied to its inner peripheral surface is disposed over a spliced area and shrinks over the splice area upon application of, for example, an open flame. A secojd approach as disclosad in Siebert U.S. Pat. No. 3,515,798 has been to provide an elastically shrinkable tubular cover supported in radially expanded or stretched condition on a removable rigid sleeve in the form of a tubular shell helically grooved along its entire length which when pulled out into a continuous strip and removed, permits collapse of the supported elastic sleeve over the spliced area. A molded rubber sleeve or tube has also been used provided with grooves at each of its ends. The tubes have been made in large diameters so that they can be positioned over the splice areas of the cables. O-rings are provided on the outer surface of the tube disposed within the grooves to seal the ends of the tube.

The prior art approaches have all had certain disadvantages. For example, the use of a heat shrinkable cover has been limited since its utilization is dependent upon the availability of sources of heat or electrical current which may not be readily available in underground mines. More importantly, the heat shrinkable type cover presents a definite safety hazard when used in underground locations due to the dangers of fire and explosions. In addition, the heat shrinkable covers have been known to fail after limited periods of service due to relative low tensile strength and poor abrasion resistance. The use of a pre-expanded tube also has disadvantages in that a permanent set condition may develop when the elastomeric material of the tube is held in an expanded condition for long periods of time. In addition, it is possible that the continuous strip may become snarled and break preventing completion of the splicing operation. The molded cover with O-ring seals has also not proven successful since an insufficiently tight fit exists allowing air pockets to develop within the splice area. Furthermore, the costs of prior art covers have been high making their use undesirable.

The above-mentioned difficulties have been overcome by the present invention by use of an improved elastic cover and method of applying the cover as will be hereinafter described.

OBJECTS OF THE INVENTION

It is a general object of the present invention to provide a cover for a supporting member or work piece which is more economical and has a longer service life.

It is another important object of the present invention to provide an improved cover for a spliced or repaired section of electrical cable which is safe and economical to use.

It is another object of the present invention to provide a cover for a spliced or repaired electrical cable which is in an unexpanded condition prior to its disposition over the splice or repair and therefore will not be subject to a permanent set condition.

It is still another object of the present invention to provide an improved method of applying an elastic cover over a support member or work piece such as a spliced or repaired section of electrical cable.

Other objects and advantages of this invention will become apparent hereinafter as the description thereof proceeds, the novel features, arrangements and combinations being clearly pointed out in the specification as well as the claims thereunto appended.

In accordance with the present invention, it has been discovered that the above objects and advantages are accomplished by the use of an elastic cover for disposition over at least one supporting member with the cover comprising a hollow tube of highly expandable elastomeric material which in its unexpanded condition, is incapable of positioning over the member. Gripping means are integrally formed on the outer peripheral surface of the tube and extend longitudinally thereof. The gripping means project outwardly from the outer peripheral surface of the tube so that the tube can be expanded by outwardly directed forces acting thereon. The tube in its expanded condition is capable of positioning over the member and the tube, upon contraction from its expanded condition, surrounds and closely conforms to the member to provide a tightly fitting cover therefor.

It has also been discovered that the above objects and advantages are accomplished by providing a method of applying an elastic cover over at least one supporting member with the method comprising the steps of: (a) providing a hollow tube of highly expandable elastomeric material in an unexpanded condition with the tube being incapable of positioning over the member and the tube including gripping means integrally formed on its outer surface; (b) expanding the tube by exerting outwardly directed forces on the gripping means so that the tube is capable of positioning over the member; (c) moving the expanded tube and the member relative to each other to position the tube over the member; and (d) contracting the tube from its expanded condition so that it surrounds and closely conforms to the member to provide a tightly fitting cover.

The improved cover and method of applying the cover are most advantageously used in splicing operations involving electrical cables and particularly in field splicing operations, for example, in underground mines.

DESCRIPTION OF THE PREFERRED EMBODIMENTS

Figure 1:
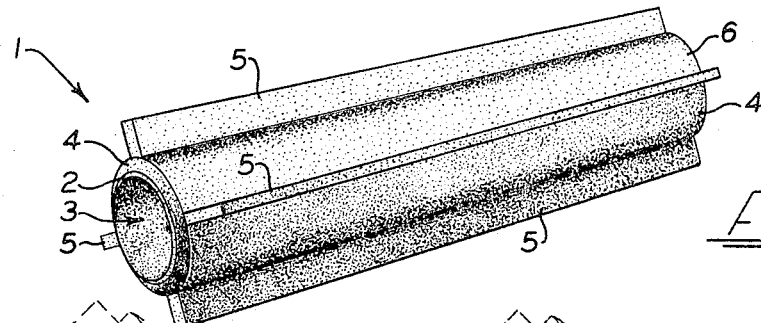
FIG. 1 is a perspective view of the elastic cover of the present invention shown in its unexpanded condition.
Figure 2:
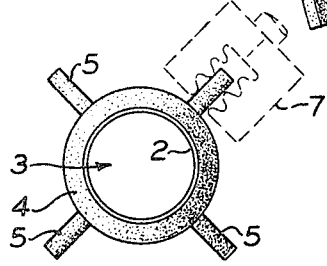
FIG. 2 is an end view of the cover shown in FIG. 1.

In FIGS. 1 and 2 the elastic sleeve or cover 1 of this invention is shown in its unexpanded condition. The cover 1 is adapted for disposition over at least one supporting member or work piece and includes a hollow tube 2 of highly expandable or stretchable elastomeric material which may be greatly expanded outwardly, for example, in a radial direction. The tube 2, as shown, is of a generally elongated cylindrical shape and contains a central bore or opening 3 extending its entire length. The tube may be of various dimensions depending upon the particular supporting member or work piece which it is to cover. The tube includes beveled portions 4 at each end to provide for substantially unobstructed movement when the member with the cover in position therearound is moved. The tube 2 may also be of other configurations if desired and need not be of a circular cross-sectional configuration only. For instance, the tube may be straight-sided or a combination of curved and straight-sided shapes such as rectangular or of other well-known geometric configurations.

The tube 2 in its unexpanded condition is incapable of being positioned over the member. In other words, the perimeter of the opening 3 of the unexpanded tube 2 is less than the perimeter of the outer cross section of the supporting member over which it will be disposed. The tube 2 may have an inner perimeter of about 25 percent less than the perimeter or circumference of the outer cross section of the member. Typically, the tube may be about 12 inches long with a wall thickness of one-eighth of an inch and an inside diameter of about seven-eighths of an inch.

The elastomeric material may be of any of the well-known rubber or rubber-like materials such as natural rubber, synthetic rubber or the like having the desirable elastic properties. Since the covers 1 are ordinarily used over splice sections of electrical cables in underground mines, it is preferred that the elastomeric material be flame-retardant as required by the United States Bureau of Mine Regulations. Flame-retardant neoprene or styrene butadiene rubber has been found to be acceptable for this purpose. It is also desirable that the elastomeric material be abrasion resistant since the cables usually are moved or dragged over rough surfaces during service. The cover 1 is preferably formed by molding but may also be extruded or cast from a material such as flexible polyurethane with the ribs 5 preferably being integrally formed on the outer surface 6 of the tube 2 during the forming operation.

Gripping means such as a plurality of removable lugs or ribs 5 of elastomeric material are integrally formed on the outer peripheral surface 6 of the tube 2 and extend longitudinally thereof. The ribs 5 project outwardly from the outer peripheral surface 6 of the tube 2 so that the tube can be expanded by expanding means attached to the ribs, as will be hereinafter described. Any number of ribs may be provided with the exact number depending upon the particular applications. In most instances, at least three ribs should be provided to achieve adequate expansion of the tube. After the cover 1 is applied over the work piece, the ribs 5 may be easily removed by an ordinary rubber mill knife or the like.

As best shown in FIG. 2, the ribs 5 may be of a uniform rectangular cross-sectional configuration having a width on the order of about one-eighth of an inch and a thickness or height of about one-half of an inch and are preferably disposed on the outer circumference of the tube 1 at equally spaced distances apart. For example, four ribs 5 may be disposed at 90° intervals around the circumference of the outer peripheral surface 6 of the tube 2. The ribs 5 are attached to expanding means such as the jaws 7 of an expanding jig or other such equipment represented in outline form in broken lines in FIG. 2. With ribs of a uniform cross-sectional configuration, the jaws 7 may be serrated for better gripping. Alternately, holes may be provided transversely through the ribs and the jaws may be attached through the holes. It should be understood that any type expanding equipment may be used for this purpose and may be operated mechanically, hydraulically or pneumatically to exert the outwardly directed forces required to expand the tube 2.

Figure 3:
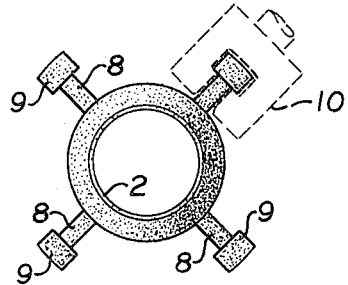
FIGS. 3 and 4 are modifications of the invention shown in FIG. 2.
Figure 4:
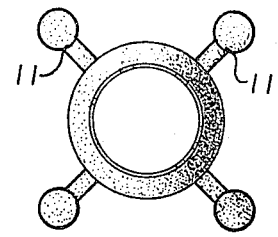

As illustrated in FIG. 3, it may be preferred that the ribs 8 include an enlarged portion 9, for instance, at the outermost ends thereof for gripping by an expanding means such as the jaws 10 of an expanding jig. The enlarged portion 9, for example, may be of a rectangular cross-sectional configuration having a width of about one-fourth of an inch and a thickness of about one-fourth of an inch. The enlarged portion of the ribs may be of a polygonal cross-sectional configuration as shown in FIG. 3 or of a curvilinear cross-sectional configuration as illustrated by the ribs 11 shown in FIG. 4.

Figure 5:
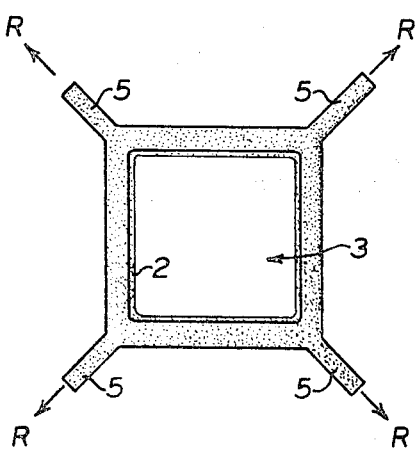
FIGS. 5 and 6 are diagrammatic illustrations showing an end view of the cover when in an expanded condition.

The tubes are typically expanded or elongated from about 100 to about 200 percent and may be expanded outwardly in various manners. As shown diagramatically in FIG. 5, the tube 2 may be expanded radially outwardly by pulling each rib 5 outwardly in a radial direction R by means of suitable expanding equipment. For example, a tube have a seven-eighths of an inch diameter provided with four equally spaced ribs on its outer peripheral surface assuming an equally applied force to all ribs will be formed into a square having an inside perimeter of 8 inches with a 2 inch square opening 3. The tube thereby undergoes an expansion or elongation of 190 percent. If the pulls on the radially aligned ribs 5 are unequal or if the ribs are disposed in unequal arrangement around the periphery of the tube, other configurations may be formed such as a rectangular opening having a length of 2 inches and a width of three-fourths of an inch, with the perimeter of the opening here being 5.5 inches. The expansion or elongation in this case is 100 percent.

Figure 6:
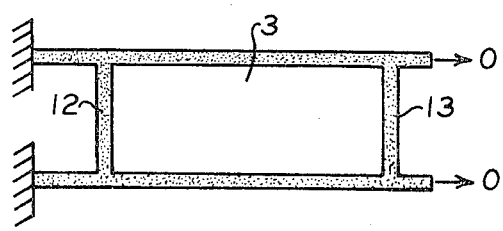

In FIG. 6 another method of outwardly expanding the tube is shown in which two ribs on one side 12 of the tube 2 are held stationary and the opposite two ribs on the other side 13 of the tube 2 are expanded in a direction O outwardly away from the held ribs on the first mentioned side 12. As illustrated, these forces may act parallel to each other in a horizontal direction. A tube having a seven-eighths of an inch diameter, for example, when pulled in this manner into a generally rectangular configuration with the opening 3 of the tube 2 having a 2 inch length and a three-fourths of an inch width is elongated 167 percent.

Figure 7:
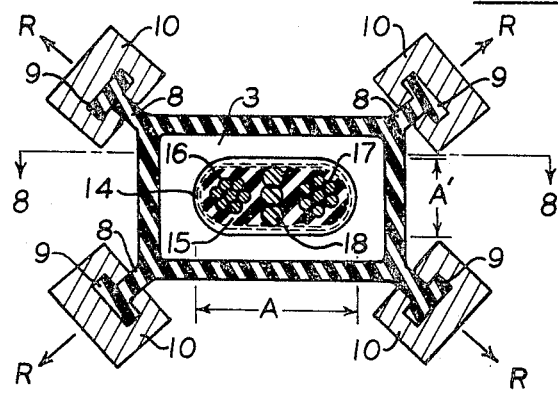
FIG. 7 is an enlarged end view of a cover shown in its expanded condition mounted in an expanding device with one end of a spliced electrical cable inserted through the opening of the cover.
Figure 8:
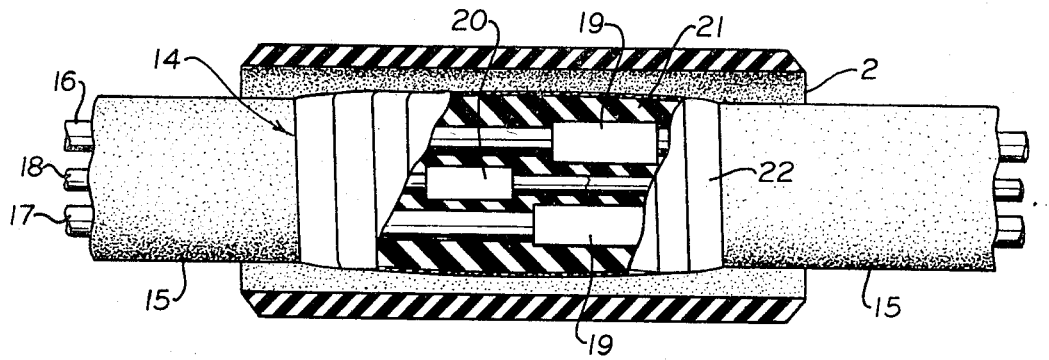
FIG. 8 is a sectional view of the expanded cover taken on line 8—8 of FIG. 7 with the spliced cable shown with parts broken away and the expanding device not shown for clarity.

The tube 2 of FIG. 3 in its expanded condition is shown in FIGS. 7 and 8. In this case, the tube 2 includes radial ribs 8 with enlarged portions 9 and has been expanded radially in the manner shown in FIG. 5 with equal forces being applied in each radial direction by the expanding menas 10 so that the tube opening 3 has been formed into a square of 2 inches on a side. The perimeter of the opening 3 of the tube 2 in this instance is greater than the outer perimeter of the cross section of the supporting member which is a spliced section of cable 14 shown as inserted in the opening 3 of the tube 2. For example, two ends 15 of a number 2 type G cable having an elliptical cross-sectional configuration with a major axis A of 1.55 inches and a minor axis A' of 0.81 of an inch is shown. Each cable end 15 includes two electrical conductors 16 and 17, for example, of five-sixteenths of an inch diameter copper and a copper ground wire 18 of rectangular configuration with a width of one-eighth of an inch and a length of seven-sixteenths of an inch disposed between the copper conductors 16 and 17. The spliced section of cable 14 is best shown in FIG. 8 and includes a metal sleeve 19 which has been crimped over the ends of the conductor wires 16 and 17 which are positioned in the sleeve 19 in an abutting relationship. The ends of the ground wires 18 are lapped and clamped together by a special clamping device 20. The conductor 16 and 17 and ground wire 18 are joined together in the splice 14 in a staggered relationship between the cable ends 15. A molded rubber insulator 21 is positioned over the staggered crimped and clamped wires and an electrical insulating tape 22, for example, of polyvinyl chloride material, is finally wrapped around the spliced assembly 14.

It should be apparent that the cover may be used with a number of cable cross-sectional configurations either generally flattened or elliptical as shown or standard circular cables. One cover may fit several sizes of cable depending upon the elasticity or expandability of the tube and the size and shape of the cables.

Figure 9:
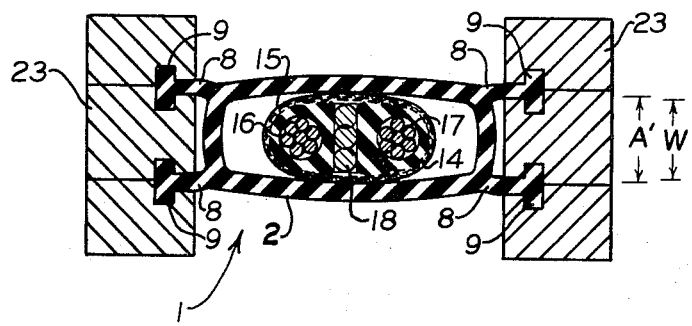
FIG. 9 is a modification of the invention shown in FIG. 7.

FIG. 9 shows a modification of the method of cover expansion in which the ribs or lugs 8 are held in the manner discussed in FIG. 6 by means of clamping jaws 23. In this case, the minor axis A' of the elliptical spliced cable section 14 has a somewhat greater dimension than the width W of the opening 3 of the tube 2, particularly since the tube tends to neck down slightly as the result of the outwardly directed horizontal forces. Accordingly, a slight amount of force is required to insert the cable end 15 through the opening 3 of the tube 2. Therefore, it is not absolutely necessary that the inner cross-sectional dimensions of the expanded tube be greater than the outer cross-sectional dimensions of the work piece or supporting member but it is necessary that the perimeter of the opening 3 of the tube be substantially equal to or greater than the perimeter of the outer cross-section of the member so that the tube can be positioned over the member as illustrated.

Figure 10:
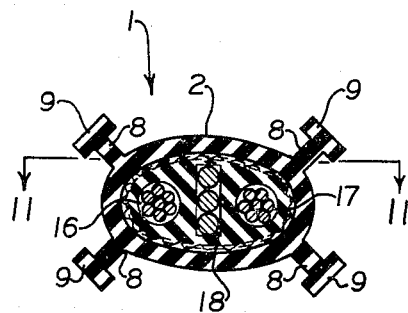
FIG. 10 is an enlarged end view of the cover after contraction in its partially expanded condition surrounding and closely conforming to the spliced section of cable.
Figure 11:
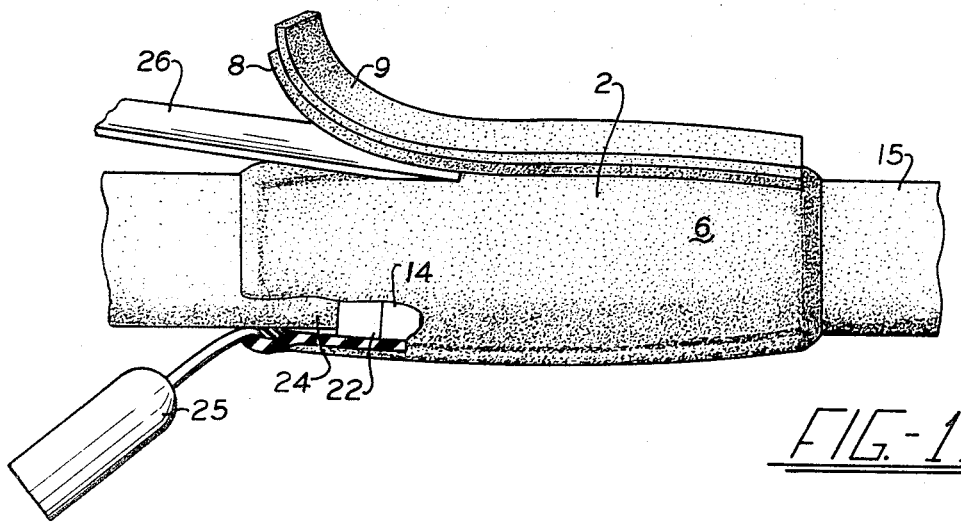
FIG. 11 is a section taken through the cover on line 11—11 of FIG. 10 with certain method steps being illustrated.

As shown in FIGS. 10 and 11, the tube 2, upon contraction from its expanded condition, will remain in a partially expanded condition to surround and closely conform to the spliced section of the cable 14, thereby providing a tightly fitting cover and seal for the splice. The cover 1 length should be greater than the length of the splice 14 so that the ends of the cover exert tension on the portions 24 of the unspliced cable 15 immediately adjacent to the ends of the splice in order to insure a proper moisture seal. In order to insure the proper continuous sealing of these ends of the cover 1 to the outer jacket of the cable 15, an adhesive should be provided, for example, by means of the can or dispenser 25 as illustrated in FIG. 11. As illustrated in FIG. 11, it is normally preferred, although not absolutely necessary, that the longitudinal ribs or lugs 8 of the cover 1 be removed from the outer peripheral surface 6 of the tube 2, for example, by means of a suitable knife 26. Otherwise, these protrusions would interfere with the winding of the lengths of joined cable.

In the method of applying the elastic cover 1 of this invention over at least one supporting member, the hollow tube 2 of the cover 1 is provided in an unexpanded condition. The tube 2 is incapable of being positioned over the member until it has been expanded by means of the gripping means such as the removable longitudinal ribs 5 formed on its outer peripheral surface 6. In other words, the perimeter of the opening of the tube should be less than the perimeter of the outer cross section of the member. Since the tube 2 is provided in an unexpanded condition, there is no danger of a permanent set developing in the elastomeric material from which the tube is made since the tube will only be expanded immediately prior to use. The tube 2 is expanded by exerting outwardly directed forces on the gripping means 5 so that the tube is capable of being positioned over the member. For this purpose, the tube should be expanded so that the perimeter of its opening is substantially equal to or greater than the perimeter of the outer cross section of the member to be covered. After the tube is expanded it is positioned by moving the expanded tube and the member relative to each other to position the tube over the member. This may be accomplished either by moving the member to the expanded tube which is in a fixed position or inserting the member into or through the opening in the tube or by moving the expanded tube over the member which may be held in a fixed position. Alternately, the expanded tube and member may each be moved toward each other. After the tube is in position over the member it is contracted from its expanded condition to a partially expanded condition by releasing or removing the forces on the gripping means. In its partially expanded condition the tube surrounds and closely conforms to the member to provide a tightly fitting cover thereover. The cover may be further adhered to the member by applying an adhesive coating at the interface between the inner surface of the tube and the outer surface of the member.

The preferred use of the cover of this invention is to seal the joint or splice in an electrical cable. The cover is particularly useful in field splicing operations, for example, in a mine where underground electrical conductors are employed. In this instance, the method of applying the elastic cover includes providing the cover in an unexpanded condition, for example, having a diameter of about seven-eighths of an inch and a wall thickness of about one-eighth of an inch. This size cover may be used for No. 1, 2 and 4 type G or type W cable similar to the cable shown in FIGS. 7–11. This cable has a generally elliptical cross-sectional configuration with major axes ranging from 1.15 inches to 1.55 inches and a minor axes of from 0.61 of an inch to 0.81 of an inch. The cables include two copper conductor wires and the type G cable also includes a copper ground wire. The tube is expanded radially by suitable expanding means as previously discussed so that the hole or opening of the tube is approximately a 2 inch square in cross-sectional configuration having a perimeter of about 8 inches. This perimeter is greater than the perimeter of the outer cross section of any of the above type cables so that one cable end may be inserted through the opening of the expanded tube to meet an opposite cable end prior to the splicing operation. It is not absolutely necessary that the perimeter of the tube opening be substantially greater than the perimeter of the outer cross section of the cables. Due to the high elasticity and expandability of the cover, the perimeter of the tube opening may be equal to or even slightly less than the perimeter of the outer cross section of the cable since the cable is thereby capable of being inserted through the opening. The tube may also be expanded by holding one side of the tube and exerting forces on the opposite side to expand or stretch the tube in a direction outwardly away from the first-mentioned side as shown in FIGS. 6 and 9. However, this method will ordinarily produce less open area through which to insert the cable.

After one cable end is inserted through the expanded tube, the splicing operation may take place. It should be understood that any splicing procedure may be used with the particular splicing method or splice construction forming absolutely no part of the present invention. The following splicing procedure is presented only as an illustrative example of a splice method and construction which is particularly suited for use in conjunction with the cover and method of the invention. For example, with particular reference to FIGS. 7–11, in each cable end 15 the two conductor wires 16 and 17 and ground wire 18 are shear cut to provide approximately a two inch length variation in each wire to permit staggered splices. The neoprene insulation jacket of each cable 15 is stripped off for about 7.50 inches and the polypropylene coating is cut and stripped from the end of each conductor wire 16 and 17. Each cable end 15 is aligned in a specially constructed crimping unit with the ends of the conductor wires being placed in abutting relationship in standard metal sleeves 19. The ground wire ends 18 are lapped for a distance of about 1 inch using a special clamp 20 and the ends are twisted to provide slack by means of a special tool (not shown). The crimped conductors 16 and 17 and clamped ground wire 18 are then inserted into a molded rubber insulator 21. The entire length of the spliced area 14 is then wrapped with a ½ of an inch wide heavy-duty polyvinyl chloride electrical tape 22.

The spliced section 14 of cable is centered approximately within the expanded tube 2 which is held in a fixed position by means of the jaws 10 of an expanding jig. The spliced area or section is about 7.5 inches in length and the tube has a length of about 12 inches. The outer cross-sectional dimensions of the splice area 14 are approximately equal to the same dimensions of the unspliced cables 15 so that only a slight build-up, if any, is present in the spliced area 14. The tube 2 is contracted from its expanded condition by releasing the expanding jig but remains in a partially expanded condition as it surrounds and closely conforms to the spliced section 14 and also to the undisturbed portions 24 of cable 15 adjacent to the ends of the spliced section 14. An adhesive, for example a flame-retardant neoprene rubber cement, is applied between the inner peripheral surface of the cover and the outer surface of the jacket of the cable by means, for example, of a reuseable dispenser 25. The adhesive may also be applied to the inner surface of the tube 2 while it is in its expanded condition and/or to the cable portions 24 and the entire spliced areas 14 before the release of the tube 2. Finally the ribs 8 may be removed if desired by means of an ordinary rubber mill knife 26 or other similar device. The crimping device, expanding device and other special splicing apparatus may be maintained on a mobile splicing cart for convenient use in underground mine facilities.

It should be apparent to those skilled in the art that the present invention provides an improved cover and method for applying the cover over a work piece such as a spliced section of electrical cable which are safe and economical to use. It should also be apparent that the elastic covers of the present invention will provide a seal for a spliced electrical cable which overcomes many of the disadvantages of the prior art.

While certain representative embodiments and details have been shown for the purpose of illustrating the invention, it will be apparent to those skilled in the art that various changes and modifications may be made therein without departing from the spirit or scope of the invention.

I claim:

1. An elastic cover for disposition over at least one supporting member, said cover comprising a hollow tube of highly stretchable elastomeric material which may be expanded outwardly thereof from about 100 to about 200 percent, said tube in its unexpanded condition being incapable of positioning over the member, means for gripping and expanding the tube integrally formed on the outer peripheral surface of said tube and extending longitudinally thereof, said means for gripping and expanding said tube comprising at least three spaced-apart ribs projecting outwardly from the outer peripheral surface of said tube so that said tube can be expanded by outwardly directed forces thereon, said tube in its expanded condition being capable of positioning over the member and said tube upon contraction from its expanded condition will surround and closely conform to the member to provide a tightly fitting cover therefor.

2. The cover as claimed in claim 1 wherein said for gripping and expanding means is a plurality of removable ribs of elastomeric material.

3. The cover as claimed in claim 1 wherein said ribs are spaced an equal distance around the outer circumference of said tube.

4. The cover as claimed in claim 3 wherein the tube includes four equally spaced ribs on its outer circumference and in its expanded condition has a generally rectangular cross-sectional configuration.

5. The cover as claimed in claim 2 wherein said ribs are a uniform cross-sectional configuration throughout the length thereof.

6. The cover as claimed in claim 2 wherein said ribs include an enlarged portion.

7. The cover as claimed in claim 6 wherein said enlarged portion is of a polygonal cross-sectional configuration.

8. The cover as claimed in claim 6 wherein said enlarged portion is a curvilinear cross-sectional configuration.

9. The cover as claimed in claim 1 wherein the ends of said tube are beveled to provide for substantially unobstructed movement of the cover when the member is moved.

10. The cover as claimed in claim 1 wherein the inner surface of said tube when in an expanded condition includes a coating of an elastomeric adhesive at least at the ends thereof to adhere the inner surface of the tube to the outer surface of the member.

11. In combination, an electrical cable including a splice section therein forming a joint in the cable, the joint comprising uncovered conductor wires, insulating means to prevent contact between the wires, insulating tape covering the splice section, and an elastic splice cover surrounding and tightly conforming to the splice section, the improvement wherein said splice cover comprises a hollow tube of highly stretchable elastomeric material, the opening of said tube in its unexpanded condition having a perimeter less than the perimeter of the outer cross section of the splice section so that the cable will not pass through the tube, and removable means for gripping and expanding said tube integrally formed on the outer peripheral surface of said tube and extending longitudinally thereof, said means for gripping and expanding said tube projecting outwardly from the outer peripheral surface of said tube so that said tube can be expanded outwardly.

12. A method of applying an elastic cover over at least one supporting member, said method comprising the steps of:

A. providing a hollow tube of highly expandable elastomeric material in an unexpanded condition, said tube being incapable of positioning over the member and said tube including gripping means integrally formed on its outer surface;

B. expanding said tube by exerting outwardly directed forces on said gripping means so that said tube is capable of positioning over the member;

C. moving said expanded tube and said member relative to each other to position said tube over the member; and D. contracting said tube from its expanded condition so that it surrounds and closely conforms to the member to provide a tightly fitting cover thereover.

13. The method as claimed in claim 12 wherein said method includes applying an adhesive coating at the interface between the inner surface of the tube and the outer surface of the member to further adhere the cover to the member.

14. The method as claimed in claim 12 wherein there are two supporting member and after the expanding step said method includes inserting an end of one member through the expanded tube to meet an end of another member, splicing the two ends of the member together to form a spliced section joining the two members, disposing the spliced section within the expanded tube with said tube substantially centered over the section, and applying an adhesive coating over at least the ends of the section.

15. The method as claimed in claim 12 wherein said gripping means is a plurality of removable ribs of elastomeric material and said method includes removing said ribs after contracting the tube.

16. The method as claimed in claim 12 wherein said method includes holding one side of said tube and expanding the opposite side of said tube in a direction outwardly away from said first-mentioned side,

17. The method as claimed in claim 12 wherein said method includes expanding said tube radially outwardly.

18. In a field splicing operation, a method of applying an elastic cover over a spliced or repaired section of an electrical cable, said method comprising inserting one end of the cable through an expanded hollow tube of highly expandable elastomeric material, splicing the two ends of the cable together to form a spliced cable and disposing the spliced section of cable within the expanded tube and contracting the tube, the improvement comprising: providing the hollow tube at the splicing site in an unexpanded condition to avoid a permanent set condition with the opening of said tube having a perimeter less than the perimeter of outer cross section of the cable section and said tube including removable gripping means integrally formed on its outer surface; and expanding said tube by exerting outwardly directed forces on said gripping means so that the perimeter of the opening of said tube is substantially equal to or greater than the perimeter of the outer cross section of the cable section so that the tube is capable of receiving the spliced or repaired section of cable.

19. The method as claimed in claim 18 wherein said method includes radially expanding said tube equally in each radial direction.

* * * * *

PO-1050
(5/69)

UNITED STATES PATENT OFFICE
CERTIFICATE OF CORRECTION

Patent No. 3,770,876        Dated November 6, 1973

Inventor(s) Herman B Post

It is certified that error appears in the above-identified patent and that said Letters Patent are hereby corrected as shown below:

Column 1, line 28, "secojd" should read --second--.

Column 8, line 62, after "said" insert --means--;

line 63, delete "means".

Signed and sealed this 16th day of April 1974.

(SEAL)
Attest:

EDWARD M.FLETCHER,JR.             C. MARSHALL DANN
Attesting Officer                   Commissioner of Patents